Sept. 27, 1949.  P. E. RENOUX  2,482,936
ROTATING WING FOR AIRCRAFT
Filed Feb. 7, 1946
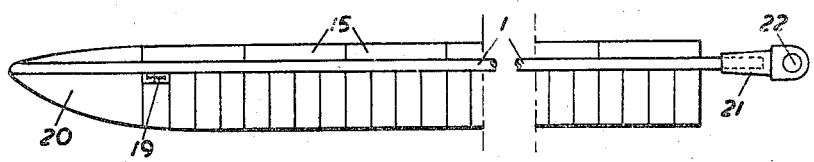
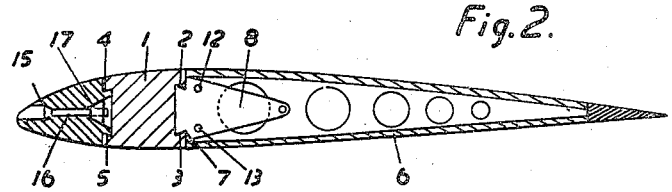
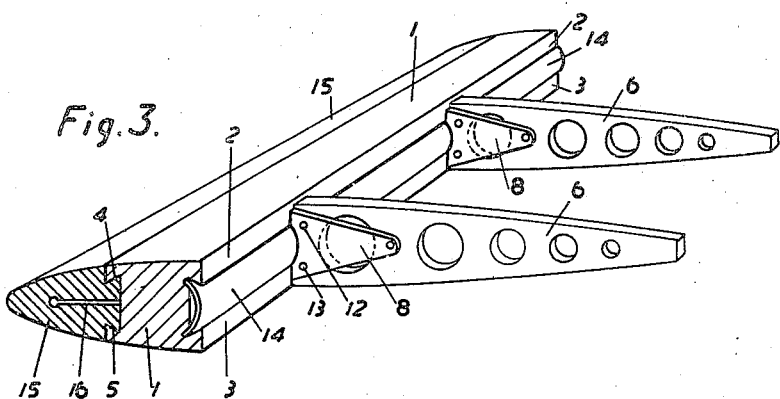
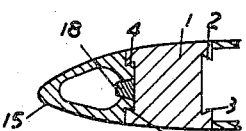 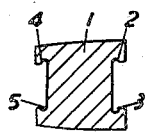 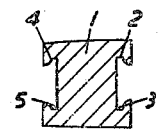
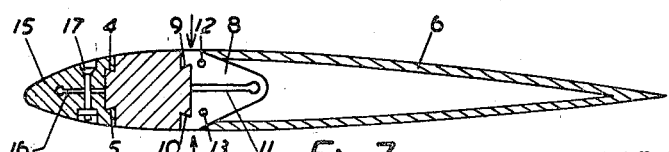
INVENTOR
PIERRE EDOUARD RENOUX
BY:
Chatrow & Company.
ATTORNEYS.

Patented Sept. 27, 1949

2,482,936

UNITED STATES PATENT OFFICE 2,482,936

ROTATING WING FOR AIRCRAFT

Pierre Edouard Renoux, Aix-en-Provence, France

Application February 7, 1946, Serial No. 646,124
In France February 3, 1942

Section 1, Public Law 690, August 8, 1946
Patent expires February 3, 1962

4 Claims. (Cl. 170—159)

The invention consists of a new method, in the construction of the supporting blades for apparatus with revolving wings.

It is known that, in apparatus of this kind, the blades, owing to their conditions of operation, are generally of great length and small section, also that they are required to have great strength in order to withstand the strains to which they are subjected, strains which are manifold, varying and alternating constantly owing to the rotation. These strains react throughout the blade.

It will at once be realised that it is extremely dangerous to weaken the constructive components of these blades by bolt holes, rivet or pin holes or others, including nicks, tenons and weldings.

Now on the one hand in the present processes of construction, bolts, split pins and other methods of joining up are indispensable, while on the other hand they represent dangers of breakage which must be avoided.

This therefore constitutes a problem, the practical solution of which seems to be always to design a principal supporting component, such as a main beam, of great length and small section, which is able to receive and to hold strongly the constructive components essential for the production of a blade for rotating wings but containing no weakening agencies either in the form of bolt or pin holes or others.

A construction of this kind is provided by the subject of the present invention which consists essentially of a longitudinal member of special section which permits of applying a process of mounting and fixing in which bolts, pins, etc. are excluded.

This is the longitudinal member of particular section which characterises the present method of mounting shown on the drawings annexed given by way of explanation and also as an example of construction of one of the forms which the subject of the invention may take.

According to these drawings:

Figure 1 is a plan, with joining lines, of the whole of a supporting blade for revolving wings designed according to the new process; Fig. 2 shows on a larger scale and in cross-section, the process of mounting and fixing the secondary component on the principal component formed by a sectional longitudinal member; Fig. 3 is a perspective view of a part of the mounting and fixing shown on Fig. 1; Figs. 4, 5 and 6 are respectively, again in cross-section, some modifications in the sectional form of the longitudinal members; Fig. 7 shows illustrated under the same conditions as Fig. 2, the use of the longitudinal member according to the variations of form shown on Figs. 4, 5 and 6.

In the examples shown here, which are not restricted, the longitudinal member 1 forming the principal component of the blade has a section of special form coming more favourably within the prismatic range; it has one or several grooves 2, 3 and 4, and 5, longitudinal, preferably dovetail or equivalent shape.

The secondary components 6 are ribs which are more clearly visible on Figs. 2, 3 and 7. They carry hooking-on parts 7 the profile of which fits exactly and without play in the grooves 2 and 3. As however these components 6 are generally thin, which permits of inserting them easily in the longitudinal members by passing them obliquely between the grooves or slots 2 and 3 and then straightening them out, perpendicularly to the plane of the blade, provision is made for lining them with metal plates 8 of triangular form, the base of which forms, by adjustment, a male part entering accurately into the profile determined by the grooves 2 and 3, Fig. 2 or a female part coacting with 9 and 10, Fig. 7. In this latter mode of fitting, slightly different from that shown on Fig. 2, the plates 8 are slit at 11, which gives them some elasticity which will, at the time when they are fixed on the component 6, allow them to open slightly and to close up in the slots 9 and 10 in the direction of the arrows, being held there by their locking points 12 and 13. The distance apart of the secondary components is maintained by stays 14, Fig. 3, which in turn enter the slots 2 and 3 or the slots 9 and 10, Fig. 7.

This same method of attachment can be utilised for the member 15 which forms the impact edge of the blade and which can if desired, be solid as shown in Figs. 2, 3 and 7 or hollowed out as in Fig. 4. The locking of the member 15 onto the longitudinal member 1 by means of the slots 4 and 5 is again obtained by the use of an elasticity slot 16 which allows the expansion of the member 15 as in Figs. 2 and 3 or its contraction as in Fig. 7 according to whether the bolt 17 with a tapered head is placed horizontally or vertically to the slot 16. Alternatively the locking by expansion of the member 15 in the slots 4 and 5 can be effected by the insertion of a bar 18 of suitable cross section to act as a wedge, as shown in Fig. 4.

The longitudinal locking of all the secondary components 6, the stays 14 and the impact edge 15 is ensured by a stop 19, Fig. 1, adjustable and of known operation, supported on the end part 20 assembled to the longitudinal member 1 in that part where the strains to be borne by the latter are feeble and the usual methods of assemblage no longer present any danger of breakage.

In the example illustrated the longitudinal member 1 is connected by a suitable mounting 21 to the driving shaft 22.

The use of this process of fitting and assemblage without bolts, pins or other means producing a weakening of the sections is a very considerable advance in the design of a blade for revolving wings, an advance determined by the industrial result obtained, likewise considered as new, which is that of using a longitudinal member the section of which shows no weakening, and which, owing to its special section, allows of receiving and fixing without bolts, pins, weldings or other all the secondary elements needed for the production of a revolving or stationary blade.

It is obvious that according to the size of the blade, the character and mode of attachment of the secondary components, the latter can be fitted to the impact edge or conversely. In like manner the dovetail shape of the grooves may vary as likewise the dimensions and the disposition without on that account altering the general conception of the invention which has just been described or its industrial result.

I claim:

1. In a rotating wing and blade for aircraft, a central longitudinal spar, upper and lower aerodynamically curved surfaces thereon, longitudinal dovetail grooves at the front and rear of said spar, a forward part for the wing, a longitudinal tenon on said forward part to engage in the groove at the front of the spar, whereby the forward part may be rigidly attached to said spar, a hollow rear portion for the wing, transverse ribs in the rear portion, tenons carried by said ribs to engage in the groove at the rear of the spar whereby the rear portion may be rigidly attached to the spar, and spacing members disposed in the groove at the rear of the spar to abut against the tenons and thereby retain the ribs in parallel position.

2. In a rotating wing and blade for aircraft, a central longitudinal spar, upper and lower aerodynamically curved surfaces thereon, longitudinal dovetail grooves at the front and rear of said spar, a hollow forward part for the wing, a longitudinal tenon on said forward part to engage in the longitudinal groove at the front of the spar and thereby serve to attach the forward part to the spar, a slot in said tenon to impart resiliency thereto, an adjustable wedge in said slot whereby the tenon may be expanded to engage more firmly in the groove at the front of the spar, a hollow rear portion for the wing, flat transverse ribs in the rear portion, plates attached at the forward end of each of the ribs, tenons at the forward part of such plates to engage in the groove at the rear of the spar and thereby serve to attach the rear portion to the spar, and resilient spacing members engaged in the groove at the rear of the spar and abutting on the tenons of the plates, thereby serving to retain the ribs in parallel position.

3. In a rotating wing and blade for aircraft, a central longitudinal spar, upper and lower aerodynamically curved surfaces thereon, longitudinal dovetail grooves at the front and rear of said spar, a forward part for the wing, a longitudinal tenon at the rear of said part to engage in the groove at the front of the spar and thereby serve to attach the forward part of the spar, a slot in the forward part to impart resiliency to the tenon and permit springing of the tenon into the groove at the front of the spar, a hollow rear portion for the wing, transverse ribs in the rear portion, plates at one end of each such rib, tenons carried by said plates engaged in the groove at the rear of the spar, and spacing members engaged in the groove at the rear of the spar abutting at their ends on the plates, whereby the ribs are retained in parallel position.

4. In a rotating wing and blade for aircraft, a central longitudinal spar, upper and lower aerodynamically curved surfaces thereon, longitudinal dovetail grooves at the front and rear of said spar, a forward part for the wing, a longitudinal tenon at the rear of said forward part to engage in the groove at the front of the spar and thereby serve to attach the forward part to the spar, a slot in the tenon to impart resiliency thereto, bolts disposed in the slot, a tapered head on said bolts engaged in the slot whereby when the bolts are tightened the tapered heads thereof move into the slot and cause the tenon to expand and engage more firmly in the groove at the front of the spar, a hollow rear portion for the wing, flat transverse ribs running fore and aft of the rear portion in upright position, substantially triangular plates attached at the forward end of each said rib, tenons at the front end of such plates to engage in the groove at the rear of the spar and thereby serve to attach the rear portion to the spar, and curved longitudinal resilient spacing plates engaged at both their longitudinal edges in the groove at the rear of the spar and abutting at their ends on the plates, whereby the ribs are retained in parallel position.

PIERRE EDOUARD RENOUX.

REFERENCES CITED

The following references are of record in the file of this patent:

UNITED STATES PATENTS

| Number | Name | Date |
| --- | --- | --- |
| 1,317,032 | Page | Sept. 23, 1919 |
| 1,796,654 | Hermann | Mar. 17, 1931 |
| 1,949,785 | LaCierva | Mar. 6, 1934 |
| 2,056,592 | Siddeley | Oct. 6, 1936 |
| 2,183,158 | Bennett | Dec. 12, 1939 |
| 2,272,439 | Stanley et al. | Feb. 10, 1942 |

FOREIGN PATENTS

| Number | Country | Date |
| --- | --- | --- |
| 14,670 | Great Britain | 1915 |
| 119,967 | Great Britain | Oct. 24, 1918 |
| 888,216 | France | Dec. 7, 1943 |